United States Patent [19]

Busby

[11] Patent Number: 4,472,787
[45] Date of Patent: Sep. 18, 1984

[54] SYSTEM FOR TRANSFERRING WORDS ON A BUS WITH CAPABILITY TO INTERMIX FIRST ATTEMPTS AND RETRYS

[75] Inventor: W. Ray Busby, Richardson, Tex.

[73] Assignee: Rockwell International Corporation, El Segundo, Calif.

[21] Appl. No.: 292,065

[22] Filed: Aug. 12, 1981

[51] Int. Cl.³ .............................................. G06F 9/00
[52] U.S. Cl. .................................................. 364/900
[58] Field of Search .................. 364/200 LE, 900 LE; 370/85, 94; 340/825.52; 371/33, 8, 11

[56] References Cited

U.S. PATENT DOCUMENTS

| 4,082,922 | 4/1978 | Chu | 371/33 |
| 4,085,448 | 4/1978 | Kogge | 364/900 |
| 4,115,854 | 9/1978 | Capowski et al. | 364/200 |
| 4,232,294 | 11/1980 | Burke et al. | 340/825.52 |
| 4,281,380 | 7/1981 | De Mesa et al. | 370/85 |
| 4,292,623 | 9/1981 | Eswaran et al. | 370/94 |
| 4,352,103 | 9/1982 | Slater | 371/8 |

OTHER PUBLICATIONS

"A Microprocessor-Controlled Packet Transmission System", Euromicro Journal, Nov., 1980, Faldella.

Primary Examiner—Gareth D. Shaw
Assistant Examiner—Tim A. Wiens
Attorney, Agent, or Firm—V. Lawrence Sewell; Howard R. Greenberg; H. Fredrick Hamann

[57] ABSTRACT

A system is disclosed for transferring words from an input source to a computer bus which can issue an acknowledge or a negative acknowledge signal. The system includes registers for storing the words to be transferred. It further includes control circuitry for initiating the transfer of a first word on the output bus, and, if negatively acknowledged, retrying the transfer. The control circuitry is further capable of initiating, before the retry, the transfer on the bus of another word or words received from the input source after the first word.

7 Claims, 12 Drawing Figures

| | | | | | | | | | | | | | | | | |
|---|---|---|---|---|---|---|---|---|---|---|---|---|---|---|---|---|
| D BUSY | 1 | 1 | 1 | 1 | 1 | 1 | 1 | 1 | 0 | 0 | 0 | 0 | 0 | 0 | 0 | 0 |
| C BUSY | 1 | 1 | 1 | 1 | 0 | 0 | 0 | 0 | 1 | 1 | 1 | 1 | 0 | 0 | 0 | 0 |
| B BUSY | 1 | 1 | 0 | 0 | 1 | 1 | 0 | 0 | 1 | 1 | 0 | 0 | 1 | 1 | 0 | 0 |
| A BUSY | 1 | 0 | 1 | 0 | 1 | 0 | 1 | 0 | 1 | 0 | 1 | 0 | 1 | 0 | 1 | 0 |
| | | | | | | | | | | | | | | | | |
| FULLM1 | 0 | 1 | 1 | 0 | 1 | 0 | 0 | 0 | 1 | 0 | 0 | 0 | 0 | 0 | 0 | 0 |
| PRSELD | 0 | 0 | 0 | 0 | 0 | 0 | 0 | 0 | 1 | 1 | 1 | 1 | 0 | 0 | 0 | 0 |
| PRSELC | 0 | 0 | 0 | 0 | 1 | 1 | 0 | 0 | 0 | 0 | 0 | 0 | 1 | 1 | 0 | 0 |
| PRSELB | 0 | 0 | 1 | 0 | 0 | 0 | 1 | 0 | 0 | 0 | 0 | 0 | 0 | 0 | 1 | 0 |
| PRSELA | 0 | 1 | 0 | 1 | 0 | 0 | 0 | 1 | 0 | 0 | 0 | 0 | 0 | 0 | 0 | 1 |

ADDRESS (top group) / DATA (bottom group)

SYSTEM FOR TRANSFERRING WORDS ON A BUS WITH CAPABILITY TO INTERMIX FIRST ATTEMPTS AND RETRYS

BACKGROUND OF THE INVENTION

This invention relates to a system for transferring data words from an input source to an output circuit such as a bus which can accept a word, as by issuing an acknowledge signal, and can refuse a word, as by issuing a negative acknowledge signal, rendering it necessary in the case of a refusal to retry transferring the word to the output circuit.

It is a conventional practice in computer systems to arrange multiple devices along a bus in such a way that any two devices can communicate with each other by means of the bus. In a typical operation, a device attempting to send information bids for control of the bus. When the device wins control of the bus, it sends a data word on the bus, along with the address of the device which is to receive the word. If the addressed device is capable of receiving the word at that time, it does so and sends an acknowledge (ACK) signal, indicating the acceptance.

If the addressed device is not capable at that time of receiving the word, it issues a negative acknowledge (NACK) signal. There can be a sufficiently large delay between the sending of the word on the bus and the receipt by the sending device of an ACK or NACK, that there is time for the sending device to send another word or words on the bus in the interim. The other words, for example, may be destined for still another device. It will be recognized that greater throughput will be obtained if a system is available which can send other words during this interval, without waiting for the receipt of the ACK or NACK. However, it will be also recognized that such a system must retain the words sent on the bus, until receiving an ACK or NACK, so that if the transfer is refused by one of the devices, it can be retried. Such a system has been conceived in accordance with the present invention.

SUMMARY OF THE INVENTION

In accordance with the present invention, there has been provided a system for transferring words from an input source to an output circuit such as a bus, which can accept a word, as by issuing an acknowledge signal, and can refuse a word, as by issuing a negative acknowledge signal. This system includes registers for storing a plurality of the words which are to be transferred. It also includes means for initiating the transfer of a first word to the output circuit and, if negatively acknowledged, retrying the negatively-acknowledted transfer. This means has the capability for initiating, before the retry, the transfer of a second word received from the input source after the first word.

In a preferred embodiment, the system of the invention maintains an indication of which of the registers are busy and selects which one is to next receive a word form the input source. In addition, there is provided means for storing the order in which the currently busy registers have received words from the input source. If, after a transfer, an acknowledge is received, the busy indication for the corresponding register is reset to indicate that the register is available to receive a new word from the input source. If a negative acknowledge is received, the adddress of the corresponding register is entered into a first-in, first-out memory. The registers are selected for output to the output circuit by first using the addresses in the first-in, first-out memory if there are any, and then selecting register addresses from the means which stores the order in which the busy registers have received input words.

It is a feature of the system of the invention that words can be repeatedly sent onto the bus, until an ACK is received. Meanwhile, the system of the invention can be sending a stream of words to another device on the bus, which is ACK'ing its transfers. The retry transfers are given priority over first attempts; however, the first attempts do continue on through the system, unblocked by the presence of the retry operation.

Although the registers of the system become written into and read from an unordered manner, the system has the capability to handle pairs of words which belong together. This is important in the case of a WRITE pair, including a command word and a data word.

Another feature of the system is that it has enhanced throughput due to a capability to generate a bid for control of the output bus very quickly after a word is received in its registers from the input source.

These and other features and advantages will become apparent from a detailed consideration of a preferred embodiment, as described below and illustrated in the following drawings.

DESCRIPTION OF A PREFERRED EMBODIMENT

Figure 1:
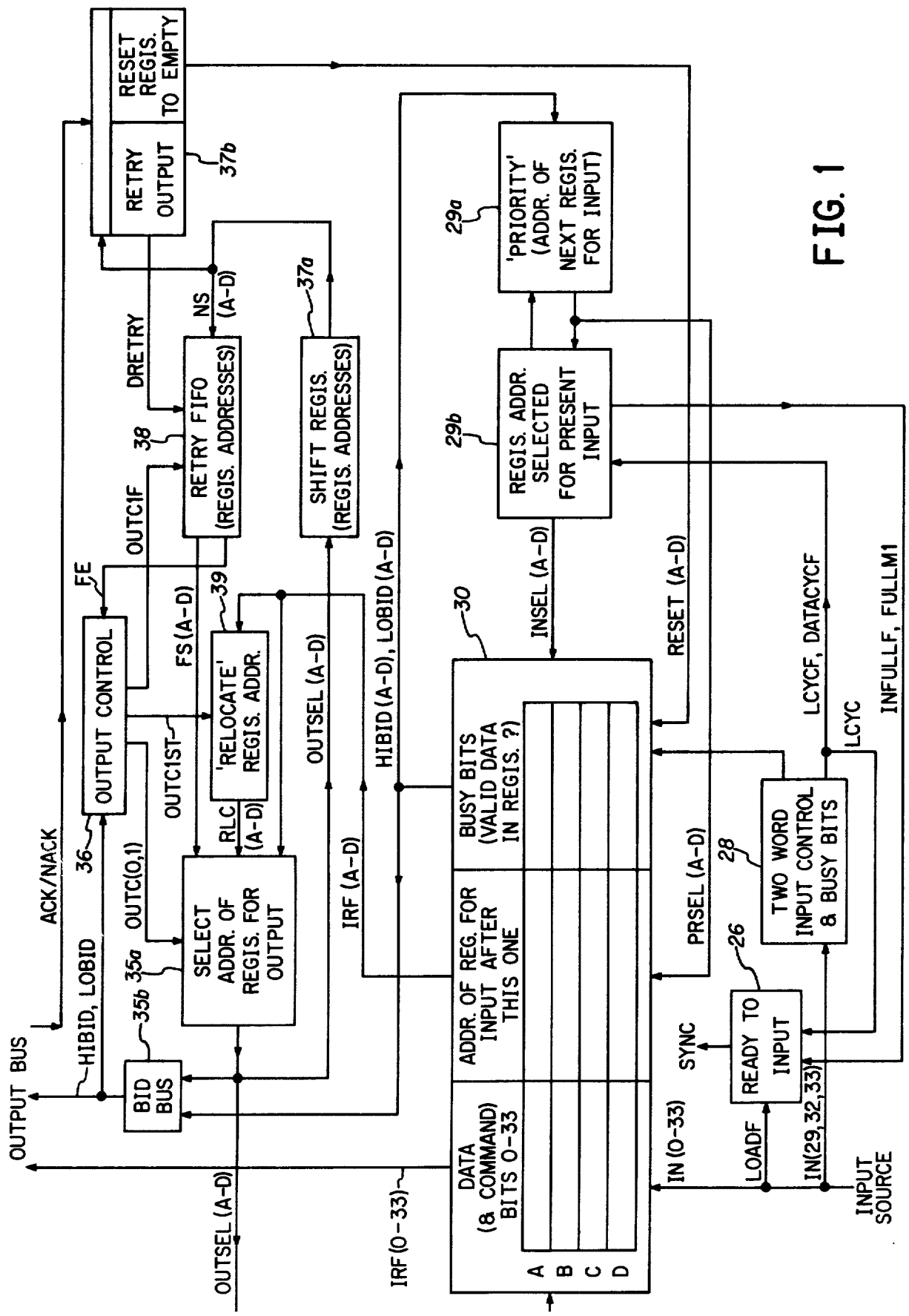
FIG. 1 is a block diagram of a system according to the invention.

FIG. 1 illustrates a system in accordance with the present invention. At the bottom of the figure is indicated an input source and at the top is an output bus. The nature of the input and output circuits is not important to the concept of the present invention. To describe a preferred embodiment in detial, examples have been employed, which assume certain command and data bit structures in the word received from the input source. In addition, limited aspects of a particular bus bidding protocol enter the description of certain circuits of the system. The conventional role of these assumed structures, and their relevance to the present invention will be readily understood by those skilled in the art.

Input Operations

An an input word is received from the input source, it is stored in one of multiple registers of input register file 30 of FIG. 1. Along with the word received from the input source, there are also stored busy bits, conveying information about the contents of the input register, and derived by a circuit 28 from one of the bits of the word from the input source.

A circuit 29a examines the busy bits of the input register file 30 and selects the next register of file 30 which is to receive a word from the input source. An associated circuit 29b does the actual enabling of one of the registers of the input file for taking in the input word, and at this time, the input register address generated by circuit 29a stored in the currently enabled (selected) register of file 30. When a WRITE word pair arrives at the input source, a part of circuit 28 controls the proper management of the input of the two words.

A circuit 26 signals the rest of the input portion of the system of FIG. 1, when a word to be transferred is ready at the input source. This circuit also deals with the circumstance of the input register file 30 being unable to receive further words and with the proper management of a WRITE pair of words.

Figure 2:
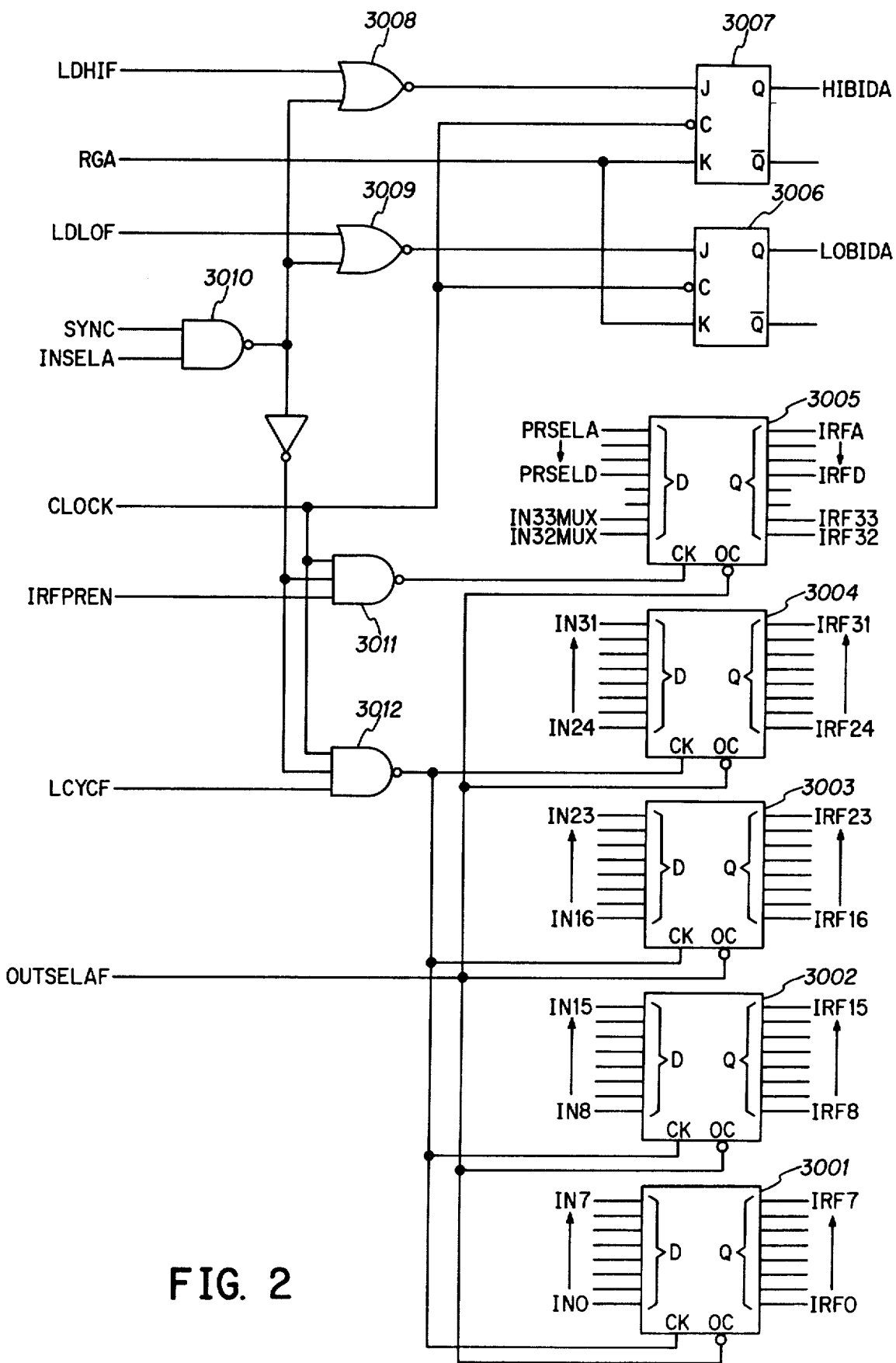
FIG. 2 is a schematic diagram of an input register for the system of FIG. 1.

Circuit 30 of FIG. 1 is an input register file having, in this example, four identical register sections A-D. FIG. 2 shows the details of one of the registers of the file, Register A. In Register A, data and command bits IN-0-IN33 from the input to the system are held in five registers 3001-3005, with outputs designated as IRF-0-IRF33. Register 3005 also holds four bits, one of which is high, designating which of the four Registers A-D is to be loaded after this register. These bits, which will be referred to as an address, come from priority circuit 29a as variables PRSEL(A-D) and are designated as IRF(A-D) at the output of register 3005.

Two flip-flops, 3006 and 3007, each hold one of two busy bits for Register A, LOVBIDA and HIBIDA, respectively. The pair of bits (HIBIDA, LOBIDA) indicates to the rest of the system whether Register A contains data which requires transfer to the output of the system. These bits also contain information necessary to bid for control of the output bus in the illustrative processing environment described. The values (0, 0) indicate no data awaiting transfer; (0, 1) indicates a processor command is there; (1, 0) indicates an input-/output command; and (1, 1) indicates the presence of a data word. The inputs to flip-flop 3006 and 3007, LDLOF and LDHIF are provided by circuit 28 of FIG. 1 as will be described below.

The system of the invention is capable of making both READ and WRITE transfers. In a READ transfer, there is only one data word, including a command portion and address portion. In a WRITE transfer, there are two words, one with a command portion and an address to be written to, and another word with the data which is to be written. The operation of the system for the one word READ transfer is simpler than for the two word transfer. Accordingly, the operation of the input portion of the system will be introduced by describing the READ transfer.

Figure 3:
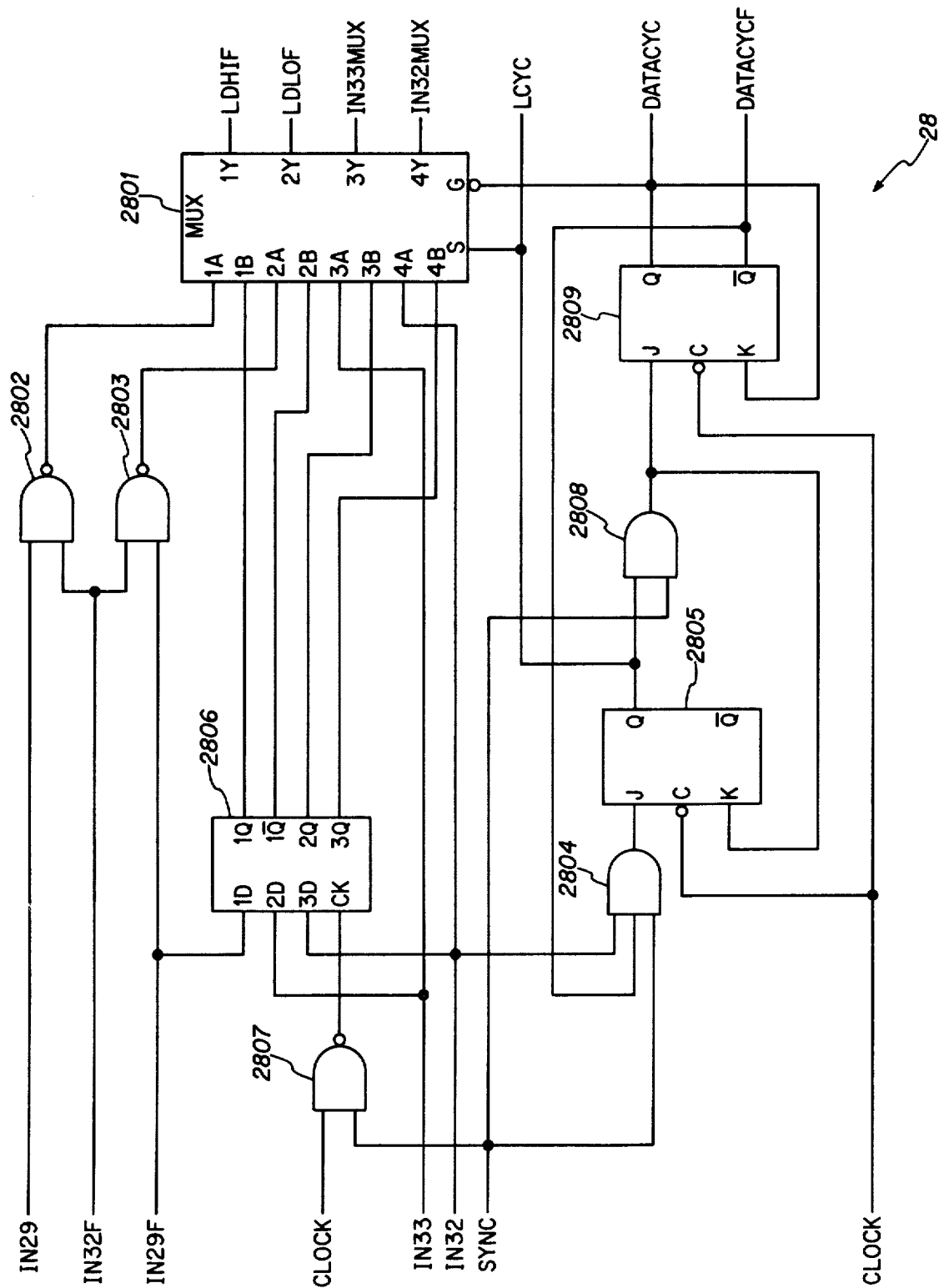
FIG. 3 is a schematic diagram of a circuit in the system of FIG. 1, handling the generation of busy bits and the problem of controlling the input of a pair of words.

FIG. 3 illustrates details of circuit 28 of FIG. 1, which has two main functions. Part of circuit 28 generates the inputs LDHIF and LDLOF to the busy bit flip-flops of the input register file 30. The remainder controls the input of two words during a WRITE transfer.

In a particular illustrative processing environment, two of the bits of the input word convey significant information to the system of the invention. Bit IN29, for a READ or for the command word portion of a WRITE, is low if the input word is a processor command, and is high if the input word is an input/output command. In the data word portion of a WRITE sequence, bit IN29 is simply a data bit. The bit IN32, for a READ word or for the command portion of a WRITE word, is high for the WRITE and low for a READ. For a WRITE data word, this bit is low.

The states of bits IN29 and IN32 are input to multiplexer 2801 of FIG. 3 through NAND gates 2802 and 2803. During a READ cycle, the A inputs of the multiplexer 2801 are selected. The input IN32F to gates 2802 and 2803 is high during a READ; therefore, the MUX output LDHIF becomes the complement of IN29, and LDLOF is the complement of IN29F. In FIG. 2, these outputs are applied to register file 30 at inputs to NOR gates 3008 and 3009. Other inputs to these gates come from NAND gate 3010 which becomes active low when SYNC indicates that there is a word ready for transfer at the input of the system and INSELA indicates that Register A has been selected to receive the input. When gate 3008 receives the low input from NAND gate 3010, it applies LDHIF, which is IN29F, to flip-flop 3007. Similarly, IN29 is applied to flip-flop 3006.

Returning to FIG. 3, it can be seen that input bits IN32 and IN33 are also applied directly to inputs of multiplexer 2801. The output of the multiplexers IN3-2MUX and IN33MUX are applied in FIG. 2 to register 3005.

During a READ transfer, the low condition of bit IN32 at the input of AND gate 2804 prevents a high state from being applied to the J input of flip-flop 2805. Therefore, LCYC, the true output of the flip-flop, remains low during a READ.

Figure 4:
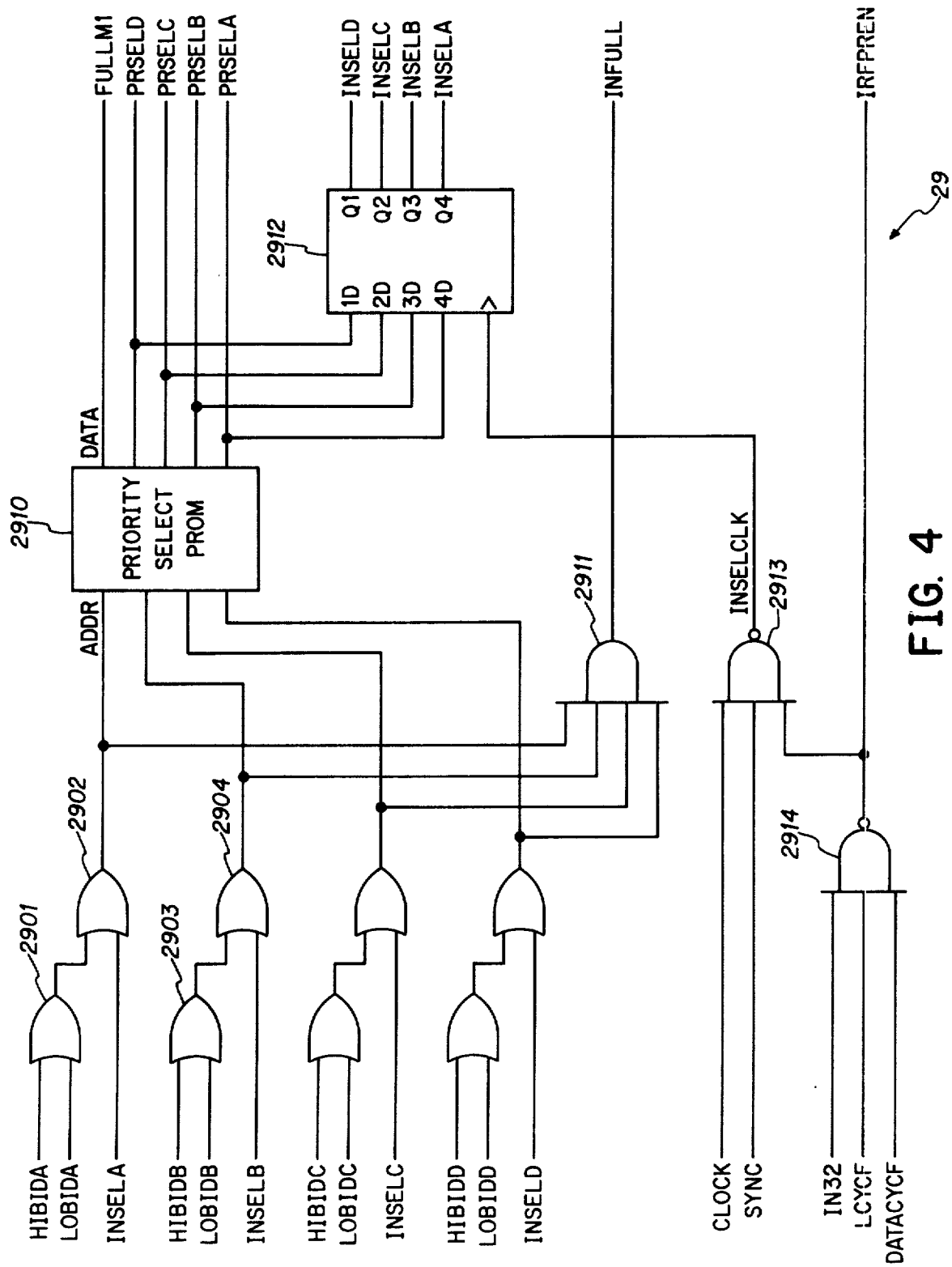
FIG. 4 is a schematic diagram of a circuit in the system of FIG. 1, for selecting the next registers to receive a word from the input source.

FIG. 4 shows circuit 29 for generating the address of the next register in the input register file 30 where an input word is to be stored. This is an important function in the present system, because the contents of register file 30 are not necessarily output from the system in the sequence A, B, C, D for registers A-D. At the input to circuit 29 are pairs of OR gates, such as 2901 and 2902, which handle bits relevant to Register A of file 30, and gates 2903 and 2904 which handle bits relevant to Register B. The inputs to gate 2901 come from the busy bit flip-flops 3006 and 3007. In accordance with the code described above, if Register A is not empty, one of the bits HIBIDA or LOBIDA will be high, causing gate 2901 to have a high output applied to an input of gate 2902. The other input to gate 2902 in INSELA, which, when high, indicates that Register A is selected to receive the next input word. Thus, the output of gate 2902 is high if Register A either currently contains data or is selected for the next input of data. It will be apparent that the other associated OR gates convey the same information about Registers B-D. These conditions are applied to the inputs of a priority select PROM 2910.

Figures 5, 11:
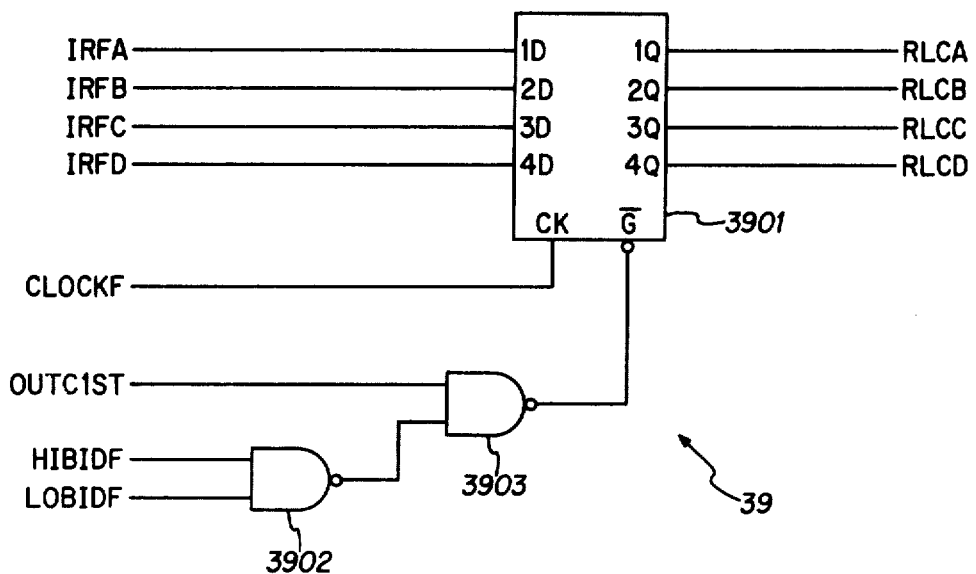
FIG. 5 is a chart showing an operable programming of a PROM in FIG. 4.
FIG. 11 is a schematic daigram of a relocated register circuit of the system of FIG. 1.

An example of how PROM 2910 can be programmed is shown in FIG. 5. The address inputs of the PROM indicate whether the Registers A-D are busy, as determined by the OR gates such as gate 2901 and 2902. The data outputs of the PROM represent which of the four Registers A-D is to be selected for input next. That is, for example, if PRSELA is high, then Register A is selected for the next input. In addition to these selection bits, PROM 2910 also outputs a variable FULLM1 ("full minus one"), which goes high whenever all but one of the Registers A-D are busy. The use of this variable will be explained below. The selection procedure implemented by the code of PROM 2910 is by no means unique, since the sequence of registers is not important in the present system. It is simply important that there be a procedure for selecting the next register to receive input, under each busy condition that can result.

The outputs of the OR gates, such as 2902 and 2904, form inputs to an AND gate 2911. The output of this gate INFULL goes high, when all the registers are busy. Although this "full" output could have been obtained from PROM 2910, the gate 2911 was used to reduce propagation delay.

Register 2912 receives the outputs PRSEL (A-D) from PROM 2910 to provide the gating signals INSEL (A-D) for that register of file 30 which is currently selected for receiving the input word. The clocking of register 2912 is controlled by gates 2913 and 2914. During a READ, the low condition of bit IN32 causes the output of NAND gate 2914 to be high, thereby making one input to NAND gate 2913 high. If the SYNC input to gate 2913 is high, indicating data ready for input to the system, then a negative going transition of the clock CLOCK at the input of 2913 will cause the output of gate 2913 to present a positive going clock edge to register 2912. This will clock into the register 2912 the outputs from PROM 2910 and cause a new register to be selected. As will be discussed again in connection with the WRITE cycle, if bit IN32 is high, indicating a WRITE, then the output of gate 2914 is held low, preventing register 2912 from being clocked and selecting a new register. The output of gate 2914 is taken as a separate variable IRFPREN to circuit 30 of FIG. 2.

Referring once again to FIG. 2, there can now be seen the completion of input for a READ word. When, as previously discussed, the SYNC and INSELA inputs to gate 3010 are high, this causes one of the inputs of each of NAND gates 3011 and 3012 to be high. As discussed in connection with FIG. 4, the variable IRFPREN will be high during a READ word. As discussed in connection with FIG. 3, LCYC is low for the READ word, so the LCYCF input to gate 3012 is high. Accordingly, a negative transition of the clock CLOCK is converted by gates 3011 and 3012 to a positive transition, and data bits IN0–IN33 are clocked into the registers 3001–3005, along with the bits PRSEL (A-D) from priority select PROM 2910. On this same clock, the busy bits LDHIF and LDLOF are clocked into flip-flops 3006 and 3007.

Special Requirements of the Two Word (WRITE) Input

Referring briefly to the output aspects of the present system, it has been conceived that greater speed can be obtained if the system immediately begins generating a bid on the bus at the output of the system, as soon as the busy bits appear in the register file 30, such as in flip-flops 3006 and 3007 of FIG. 2. Accordingly, before the busy bits corresponding to the first word of a WRITE transfer can be entered into register file 30, there must be an assurance that the second word of the WRITE is available to be brought into the register file 30, in case the system of the invention wins the bid of the output bus. This is dealt with in circuit 28 (FIG. 3) by storing the busy bits in a register 2806, until a signal is received that the second word of the WRITE is available at the input to the system.

There are other bits which must not be entered into the input register file 30 until the busy bits are. These are the outputs of the priority select PROM 2910 which, in Register A, are stored in register 3005. These bits must not be loaded until the register 2912 of FIG. 4 is loaded. Otherwise, different data could be loaded into register 3005 and register 2912. This could happen if other registers become available from successful output transfers during the interim, causing the inputs and outputs of PROM 2910 to change. The different content in the two registers would result in an output sequence different from the input sequence. Accordingly, the register 3005 is not loaded until the busy bits are ready to be clocked into flip-flops 3006 and 3007. Since bits IN32 and IN33 are to be stored in register 3005 along with the register address bits, they must be saved until time to clock in the register address bits. These two inputs IN32 and IN33 are saved in register 2806 of circuit 28 (FIG. 3).

One of the events in the switching of the information in register 2806 (FIG. 3) to the input register file is the setting of flip-flop 2805, making the signal LCYC go high. When SYNC becomes true at the input of AND gate 2804, with input bit IN32 high, indicating a WRITE, flip-flop 2805 becomes set. At the control input of multiplexer 2801, LCYC causes the B inputs to be switched to the output of the multiplexer.

The control events for both a READ transfer and a WRITE transfer will now be described in connection with the example waveforms in FIG. 7. Several of these waveforms are from the circuit 26 of FIG. 6, which generates the signal SYNC. In circuit 26, flip-flop 2601 receives a preset input from a variable LOADF. This variable is from a source not shown, indicating that data has arrived and is in registers ready to be input to the system of the invention. The arrival of LOADF causes the output of flip-flop 2601, RX, to go high as seen in the designated waveform of FIG. 7. This in turn causes flip-flop 2602 to become set, making its true output variable RXCAP high, also as seen in FIG. 7. The clock, DLY20, to flip-flop 2602 is delayed 20 ns from the main system clock CLOCK, in a particular embodiment. Flip-flop 2603 operates on a clock, DLY70, delayed 70 ns from CLOCK. When RXCAP goes high, flip-flop 2603 becomes set (by DLY70) causing the variable SYNC to become high.

As has been mentioned above, the signal SYNC indicates to the other circuitry of the system that data is available for input. Moreover, the variable SYNC is clocked by a clock pulse which is in synchrony with the clock of the system of the invention; the same cannot be said for the ready signal LOADF. Further, SYNC indicates that there is a register in input register file 30 available for loading with the newly arrived data. Inputs INFULL and FULLM1, to circuit 26 from circuit 29, deal with the availability of space in the register file 30.

The variable INFULL goes high whenever all the Registers A-D of the register file are busy in the sense detected by the gates like gate 2901 and 2902 of FIG. 4. It will be recalled that this includes counting a register as busy, when its input select variable INSEL(A-D) is high. Thus, when INFULL is high, all the registers are not actually full; one is selected for input but does not yet contain valid data. However, it is a feature of this particular embodiment, that a maximum of three of the Registers A-D may be loaded with data at any one time. This is because each register when loaded must receive the PRSEL(A-D) bits pointing to the register to be loaded next. If the fourth register were to be loaded, it would be placed in the position of pointing to a full register, which is not acceptable. For this reason, INFULL goes high, when all four registers or register file 30 are busy, but only three are filled with data. The output FULLM1 indicates when all but one of the four registers is busy.

In the operation of circuit 26, if INFULL becomes high at the input of NAND gate 2604, while SYNC flip-flop 2603 is in the reset state, then the clear input of flip-flop 2603 will be activated, keeping SYNC from being set by input RXCAP. The operation of FULLM1 will be described below.

The variable SYNC forms an enabling input to a number of other circuits, including input register file 30. In the particular case of circuit 29 of FIG. 4, when SYNC becomes high, gate 2913 passes a clock edge to register 2912 as shown by the trace INSELCLK in FIG. 7. Similar inputs allow the register of file 30 addressed by the output of 2912 to load in coincidence with the update of 2912.

The RX flip-flop 2601 is reset at the clock by SYNC becoming high, by way of AND gate 2605. The the low value of RX at AND gate 2606 causes the SYNC flip-flop 2603 to be cleared. In addition, the RXCAP flip-flop 2602 is reset by RX becoming low.

The control events for a WRITE two word pair are more complex than for a READ word. However, for the command word of the WRITE, the setting and resetting of RX, RXCAP and SYNC is the same as for a READ. In the operation of circuit 28 of FIG. 3, a WRITE command word causes IN32F to be low at the input of NAND gates 2802 and 2803, holding outputs LDHIF and LDLOF of multiplexer 2801 high, so as to present low values to the busy bit flip-flops of register file 30. When the SYNC input to NAND gate 2807 becomes true, the clock is enabled to enter the bits IN32, IN33 and In29F into register 2806. Further, the appearance of a high value of SYNC at gate 2804 causes flip-flop 2805 to become set at the clock, with its output LCYC high.

As the clock is causing the foregoing events in circuit 28, register 2912 of circuit 29 in FIG. 4 is being prevented from being clocked. The appearance at the input of NAND gate 2914 of a high value for IN32 causes the output of the gate, IRFPREN, to be low, and blocks the passage of the system clock through NAND gate 2913 to register 2912. The latter can be seen in FIG. 7 as the absence of a clock pulse in the INSELCLK trace at the end of the first SYNC pulse of the WRITE cycle. The result is to prevent the next register of register file 30 from being selected for input, since the input of the first WRITE word is not complete.

Referring to the typical register of register file 30 in FIG. 2, it can be seen that the high values of busy bit inputs LDHIF and LDLOF cause flip-flops 3006 and 3007 to remain reset, indicating at the output of the register file that Register A is empty. The input IRFPREN, just described as generated by circuit 29, has a low value, preventing, at NAND gate 3011, register 3005 from clocking in the bits PRSEL (A-D) and IN32 and IN33. However, at gate 3012, the clock is passed through to registers 3001-3004. This causes bits IN0-IN31 to be clocked into Register A at the same time bits IN32 and IN33 are being saved in circuit 28, and the LCYC flip-flop 2805 of that circuit is being set.

Figure 6:
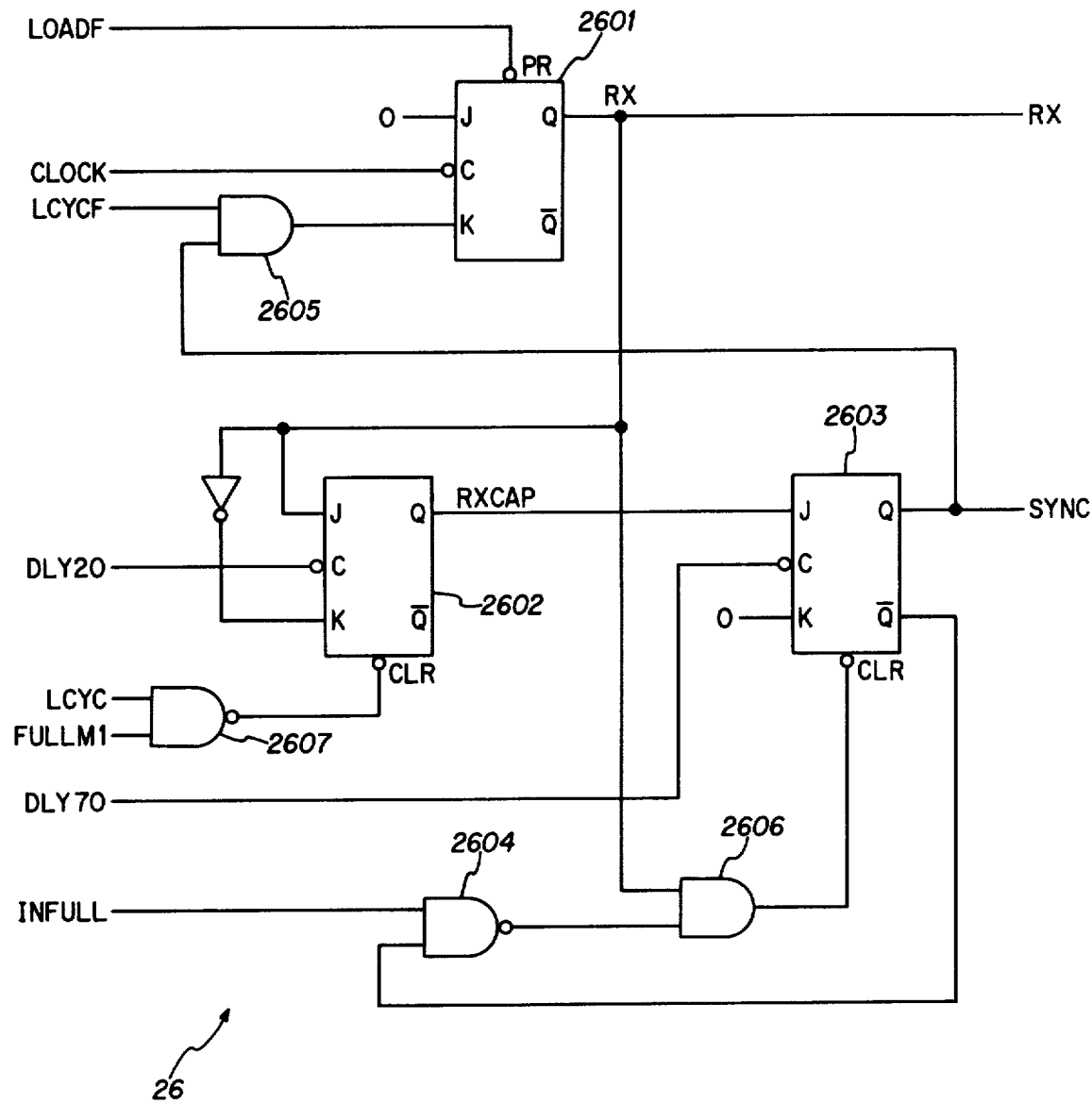
FIG. 6 is a schematic diagram of a circuit of the system of FIG. 1 for indicating the presence of a word at the input source.
Figure 7:
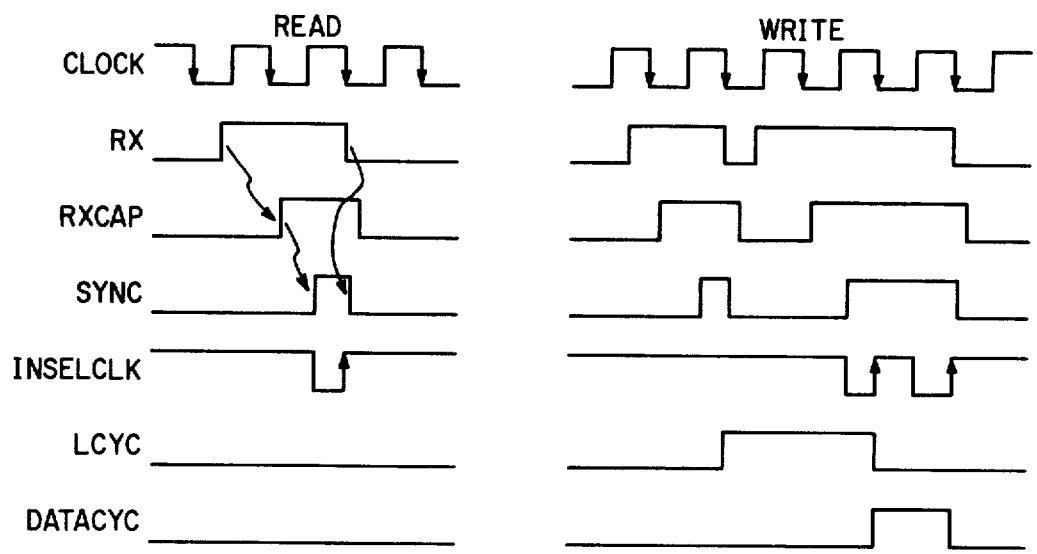
FIG. 7 is a group of stylized waveforms illustrating the opertion of the system of FIG. 1.

When the data word portion of a WRITE pair has arrived, as indicated in circuit 29 of FIG. 6 by the input LOADF, the variables RX, RXCAP and SYNC are set in the usual way. Then, because the variable LCYC is set at this time, the system proceeds to complete the loading of register file 30 with portions of the command word which were hdle back until the arrival of the data word.

It is to be noted at this point with respect to circuit 26 of FIG. 6, that if the input FULLM1 to NAND gate 2607 is high, indicating that all the registers in register file 30 are busy (loaded or selected for input) except one, then the RXCAP flip-flop 2602 is cleared, preventing SYNC from being set. This is because once the register selected for input had been loaded with the WRITE command word, the last non-busy register would become busy, and the loading of the WRITE data word could not be permitted. When another one of the registers of file 30 became available, the WRITE pair input could proceed.

In circuit 28 of FIG. 3, the variable LCYC at the control input of multiplexer 2801 causes the busy bits and IN32 and IN33 stored in register 2806 to be switched to the output of the multiplexer 2801. This connects the stored bits to the register of FIG. 2. The application of the enabling inputs SYNC and INSELA permits the busy bits to be clocked into flip-flops 3006 and 3007 of FIG. 2. At gate 3011 of FIG. 2, the variable IRFPREN from circuit 29 of FIG. 4 is high, as will be described; therefore, the inputs IN32MUX and IN33MUX, as well as PRSEL (A-D) are clocked into register 3005, at the same time the busy bits are entered into the register file 30.

At the same time that the busy bits and remainder of the WRITE command word are being clocked into register file 30, other variables are changing as well. In FIG. 3, the high value of SYNC at the input of gate 2808 causes LCYC flip-flop 2805 to be reset and DATACYCF flip-flop 2809 to be set. In FIG. 4, the fact that LCYCF is low at the input of gate 2914 causes the output of that gate IRFPREN to be high, as mentioned above. By means of gate 2913, this enables register 2912 to be clocked, causing a different one of its outputs INSEL (A-D) to become high. This selects a new register of register file 30 to receive input.

As the remaining information from the first WRITE word is being entered in register file 30, the RX flip-flop 2601 is not reset as it has been in other cases, because the low value of LCYCF at the input of gate 2605 prevents it. As a result, the important variable SYNC remains high, permitting the entry of the data word on the next clock.

The entry of the WRITE data word is accomplished while the signal DATACYC is true. This signal performs several important functions. It causes all of the outputs of multiplexer 2801 of FIG. 3 to go low, causing both busy bits of the selected input register to be set, thereby signifying by a (1,1) content a data word in the register. It also causes the values for bits 32 and 33 to be loaded into the selected input register as zeros, since both IN32 MUX and IN33 MUX are low. The low level of DATACYCF at the input of gate 2914 of FIG. 4 allows gate 2913 to generate another INSELCLK pulse (the second pulse shown in FIG. 7 under WRITE), and also allows the load of the register 3005 in FIG. 2 of the selected register of file 30.

Thus, the result is that all bits of the selected register of file 30 as well as the HIBID/LOBID busy bits and the register 2912 of FIG. 4 are clocked simultaneously, loading the data word and its identifying (1,1) value of the busy bits, and updating to select the next input register. That same clock edge also causes the DATACYC flip-flop 2809 to reset itself.

In circuit 26, the WRITE cycle input operation is completed, as the high condition of LCYCF allows the flip-flops for RX, RXCAP and SYNC to be reset.

Output Operations

Once a register of input register file 30 has been filled, the system begins the process of sending the information from the register to an output bus. A bidding circuit 35b bids for control of the output bus by the system. If the bid is won and the system of the invention gains control of the bus, it outputs a data word from a register in register file 30 onto the bus. If the device on the bus which is to receive the word sends an ACK, then the output transfer is complete. If instead, a NACK is received, then the transfer must be attempted again.

A circuit 35a selects which of the registers of register file 30 is to be output. If there are no words for output which have been NACK'ed, then circuit 35a makes its selection of a register for output from the bits IRF(A-D) of register file 30, or in some cases, from relocate register 39. It will be remembered that the bits IRF(A-D) indicate which register is to be loaded after the register containing the bits. As a result, a register can be selected by circuit 35a for output on the same clock cycle on which it is selected for input by circuit 29c.

When the contents of a register in input register file 30 are put on the output bus, then the address of the register is sent through a shift register 37a. If the attempted bus transfer is NACK'ed, the register address is entered from the shift register into a first-in, first-out (FIFO) memory 38, from which the address can be selected by circuit 35a for another attempt to transfer on the bus. The reason for the shift register 37a is because there is a delay between putting a data word on the output bus and the receipt of an ACK or a NACK. The register file 30 address corresponding to an attempted transfer on the output bus appears at the output of shift register 37a at the same time that the corresponding ACK or NACK is detected from the output bus.

If circuit 35a has just been engaged in a retry from the FIFO memory 38, then it looks to the "relocate" register 39 to select the address of the next register for output. An output control 36 commands which address source circuit 35a is to select from.

A circuit 37b is responsive to the ACK or NACK from the output bus to either initiate a retry (NACK) of an output transfer or to recognize that the transfer is complete (ACK) and set the corresponding register of register file 30 to a condition ready to receive new input.

Figure 8:
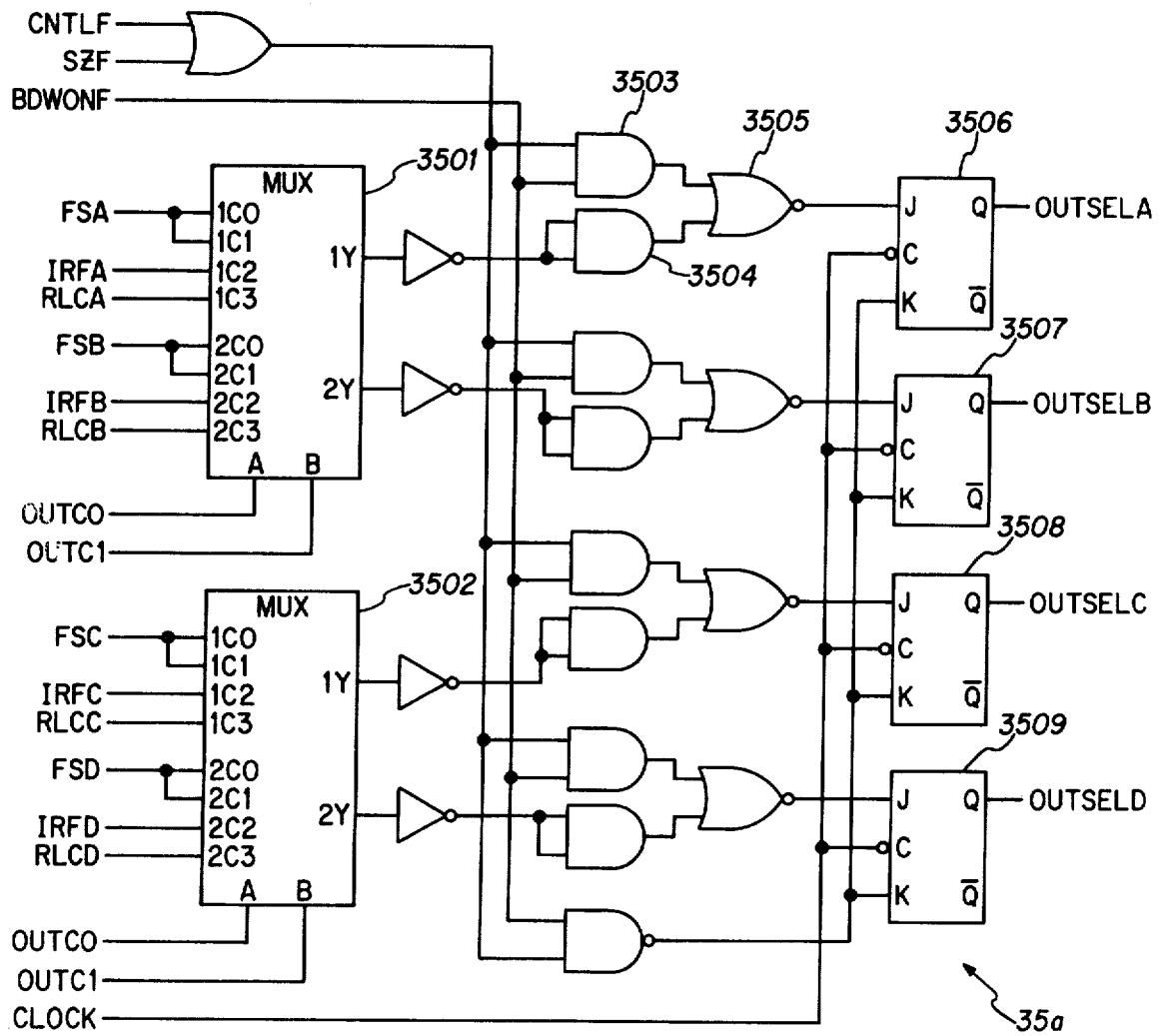
FIG. 8 is a schematic diagram of a circuit of the system of FIG. 1 for selecting a register for output.

The details of circuit 35a are shown in FIG. 8. One set of inputs to the circuit are the bits IRFA, IRFB, IRFC and IRFD. At any one time, one of these bits will be high and the others low, the high bit thereby pointing to one of the four registers A-D of input register file 30. This set of bits will be termed an address of the register throughout the following discussion. Similarly, the bits FSA-FSD represent the kind of four bit address from retry FIFO 38. The bits RLCA-RLCD are an address presented by the relocate register 39. At multiplexers 3501 and 3502 in FIG. 8, the output selection circuit 35a chooses between these three addresses under the control of inputs OUTC0 and OUTC1 from the output control 36.

The outputs of the multiplexers 3501 and 3502 go to a configuration of logic gates such as gates 3503, 3504 and 3505, which also receive inputs BDWONF and SZF. The latter two signals are from circuitry not shown, which is associated with the bid protocol of the output bus. BDWONF is false, if the system of the present invention has won its bid for control of the out bus. The variable SZF is false, if the system of the present invention has control of the output bus by virtue of the necessity to send the second word of a two word (WRITE) bus transaction. Thus, these two variables indicate that the system of the present invention has control of the bus. When either of them is false, then a high logic state at the output of multiplexer 3501 or 3502 causes the corresponding one of flip-flops 3506-3509 to be set at the clock. The output of the set flip-flop OUTSELAF-OUTSELDF activates tri-state outputs of the corresponding register file 30 (FIG. 2).

Figure 9:
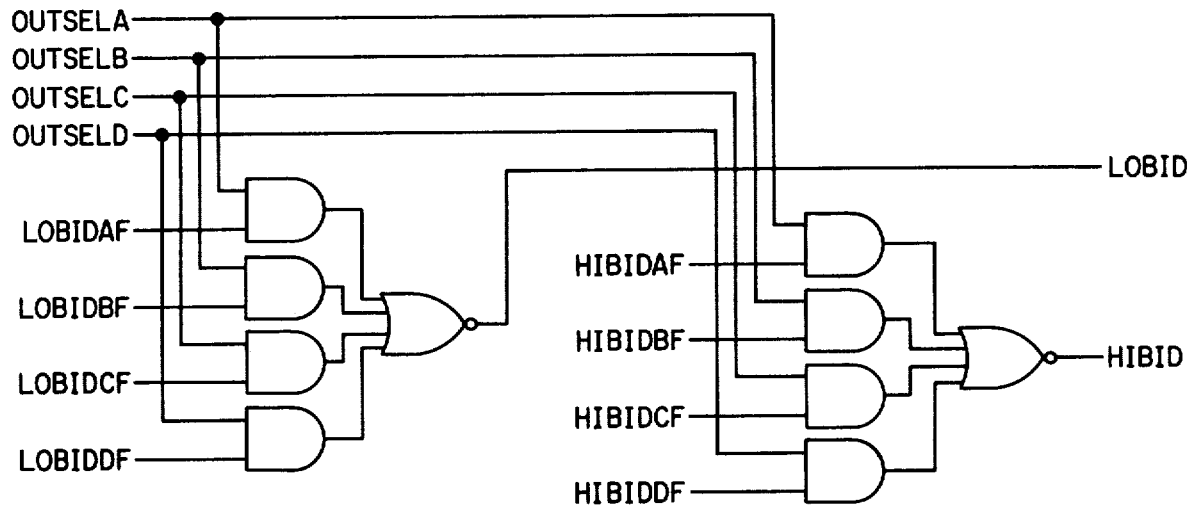
FIG. 9 is a schematic diagram of a circuit of the system of FIG. 1 for generating a bid to control the output bus.

FIG. 9 illustrates the logic for using the output of select circuit 35a to switch the busy bits of the selected register to form a bid on the output bus. The operation of the logic is self evident and is shown mainly to emphasize that once circuit 35a has made a selection of a register for output, a bid is generated from the busy bits with only the small amount of delay generated by the logic gates of FIG. 9. The operation and the advantage of this can be illustrated by an example in which it is assumed that there are no registers for which an output transfer is to be retried because of a previous NACK. Then, for example, if Register B of register file 30 is about to be loaded with input data, the address of Register B will be available to multiplexers 3501 and 3502 of circuit 35a (FIG. 8). They are made available to that circuit for example as bits IRFA-IRFD of the register just previously loaded. Then on the clock edge at which Register B is loaded with a new input word, the address of Register B is clocked into flip-flops 3506-3509 (FIG. 8) of circuit 35a. Thus, in bus bid circuit 35b of FIG. 9, as soon as the newly arrived value of one of the variables LOBIDAF-LOBIDDF and HIBIDAF-HIBIDDF are available, the corresponding values of OUTSEL(A-D) are also available. A bid can be generated very quickly after a new input is received by the system in register file 30.

Figure 10:
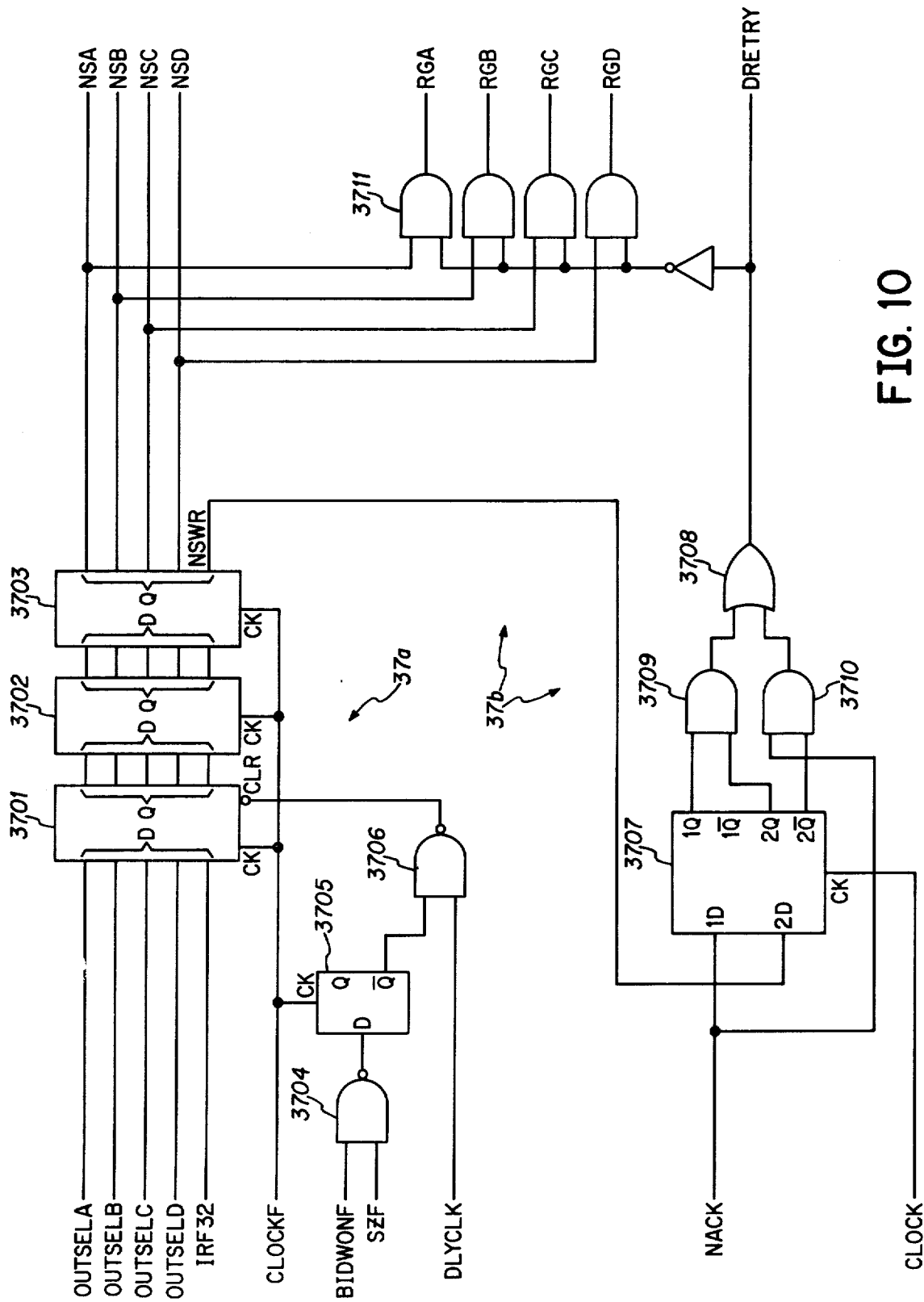
FIG. 10 is a schematic diagram of a circuit of the system of FIG. 1, including a shift register, for initiating retrys of transfers and resetting registers available for input.

FIG. 10 illustrates shift register 37a and an associated circuit 37b which generates the command to retry output after a NACK. As explained above, the shift register is employed to deal with a fixed delay between the winning of a bid for control of the output bus and the receipt of an ACK or NACK from the device to which data has been transferred on the bus. In this particular case, the shift register is designed to pass the inputs OUTSELA-OUTSELD through three stages of delay, by means of registers 3701-3703. The output address from the register is labeled by variables NSA-NSD. The inputs BDWONF and SZF to a gate 3704, flip-flop 3705 and gate 3706 serve to clear the first register 3701 if the system of the invention has not gained control of the output bus. This keeps the output address from beginning to propogate through the shift register, until data is to be actually sent onto the output bus. One of the inputs to gate 3706, DLYCLK, is a version of the system clock which is delayed somewhat so as to properly interact with the output of flip-flop 3705.

The shift register 37a has an additional input bit IRF32 from the output of register file 30. When this is a bit from the command field of the word in register file 30, it represents whether the command is a READ or a WRITE. This bit, shifted by the delay of the register is referred to as NSWR, and is one of the inputs to circuit 37b. This input is taken to one input of a register 3707, which has connected to the output thereof logic for deciding whether to command a retry of a transfer to the output bus. The other input to the register 3707 is the NACK variable.

The logic which includes OR gate 3708 and AND gates 3709 and 3710 is inserted to ensure that the two words of a WRITE pair are both retried or both not retried. Thus if through some mistake, one of the words of the pair is ACK'ed while the other is NACK'ed, they will nevertheless be treated the same with respect to a retry.

The NACK signal is applied directly to one input of AND gate 3710. The other input of gate 3710 is from the false output of that portion of register 3707 which receives the NSWR signal from shift register 37a. When the command word of a WRITE comes out of shift register 37a, the immediately preceding word from the shift register cannot have been a WRITE command word; therefore, the value of NSWR stored in register 3707 must cause its false output to be high. Assuming NACK is high, this causes AND gate 3710 to generate through gate 3708 a high state for DRETRY, initiating a retry from retry FIFO 38. Then on the next cycle, when the data word of the WRITE is coming out of shift register 37a, the register 3707 output corresponding to a stored value of NSWR will have the true output set, presenting one high input to NAND gate 3709. The other input to gate 3709 will be high because on the previous cycle NACK was high. This again generates through gate 3708 a high value of DRETRY, causing a retry. It can be readily seen that if NACK is low on the first word of the WRITE pair, there will be no entry caused by the arrival of the first word and no retry on the second either.

The AND gates, such as AND gate 3711 of circuit 37b (FIG. 10) control the resetting of the busy bit flip-flops in register file 30. As a register address appears at the output of shift register 37a, if DRETRY is low, because NACK is low, then the word previously transferred on the output bus has been acknowledged, and the particular register of file 30 which is addressed by the output of the shift register can be reset ready to accept new input. For example, if Register A is addressed, then the output RGA of AND gate 3711 will become high. In FIG. 2 it can be seen that this resets busy bit flip-flop 3007 and 3006, indicating to the priority select circuit 29a (FIG. 1) that the Register A is ready to receive new input.

The output of the shift register 37a, NSA-NSD is applied to the input of retry FIFO 38. FIFO buffer 38 can be a commercially available unit, or a conventional, custom design. Its outputs, which go to output selection circuit 35a are designated FSA-FSD. It also gives an indication, FE, to output control 36, when it is empty. The receipt of the DRETRY in the high state causes the FIFO to load the input bits NSA-NSD. The FIFO also receives from output control 36 an enabling input OUTC1F which activates an output from the FIFO.

FIG. 11 shows the relocate register circuit 39. Gates 3902 and 3903 combine to provide an input to the register 3901 itself, which enables the clock input to the register. The inputs, HIBIDF and LOBIDF, to gate 3902 indicate the existence of a word in register file 30 ready to be transferred to the output bus. The input OUTC1ST, as will be elaborated upon below, is low when the inputs IRFA-IRFD to register 3901 are from a register in input register file 30 selected with an address just obtained from FIFO 38. In this condition, gate 3903 is prevented from applying an enabling level to register 3901. This is because the purpose of the relocate register circuit 39 is to hold the address of the next register which would be selected for output, if there were no intervention of an address from FIFO 38. Accordingly, when FIFO 38 is active and causes the address on lines IRFA-IRFD to change, these are ignored by the relocate register circuit 39.

Figure 12:
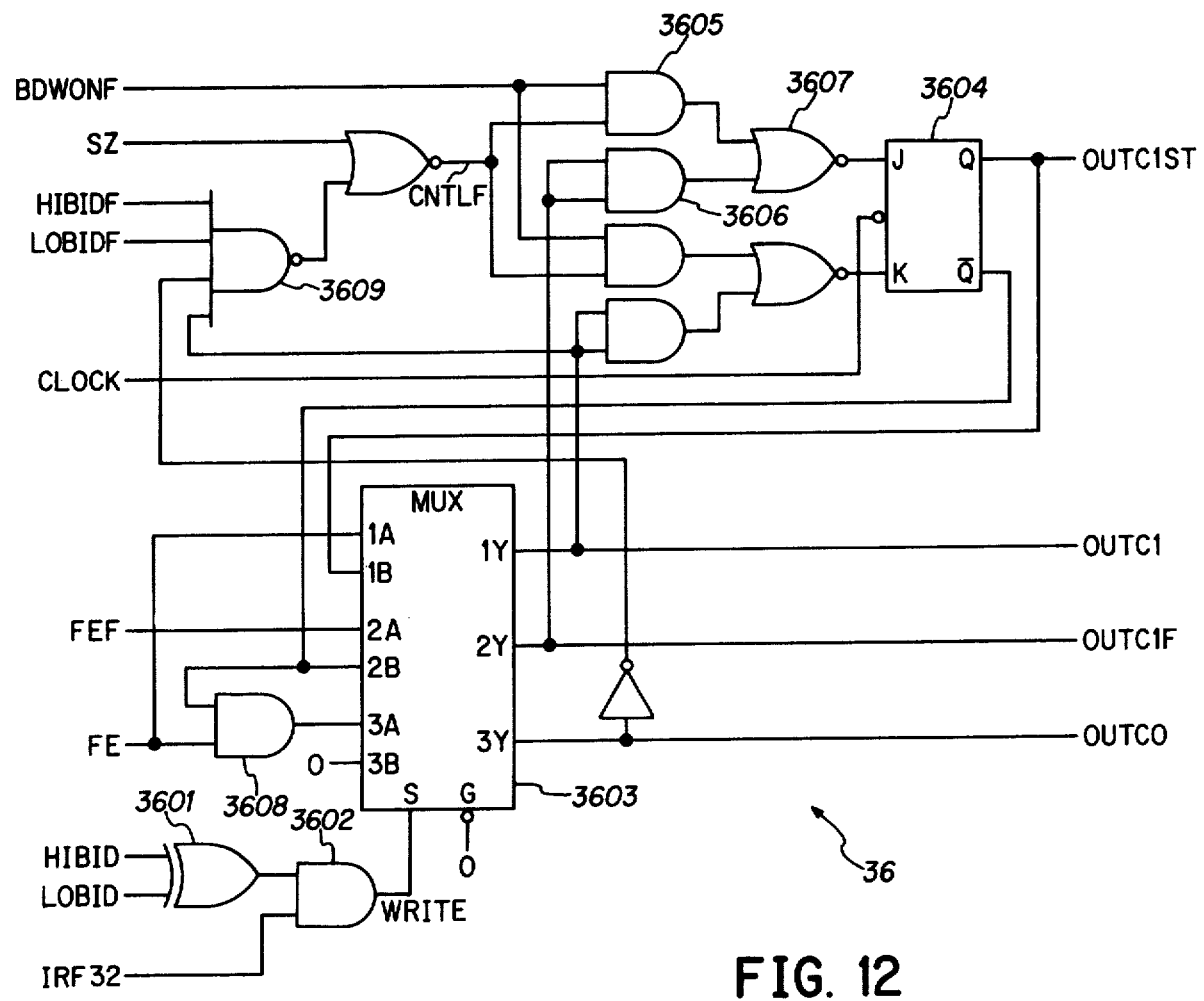
FIG. 12 is a schematic diagram of the output control circuit 36, shown in FIG. 1.

FIG. 12 shows the operation of the output control circuit 36. The significance of the outputs from this circuit is that if OUTC1 is low, then the output selection circuit 35a will select the next register address to be used for output from the FIFO 38. If OUTC1 has a high value, and OUTC0 is low, then output select circuit 35a chooses the next register address for output from the input register file 30. If both OUTC1 and OUTC0 are high, then output select circuit 35a chooses the next register address from the relocate register circuit 39.

Two important inputs to control circuit 36 are FE, indicating that the FIFO 38 is empty, and FEF (the false version of FE), which indicates, when high, that there is an address in the FIFO 38. Other inputs to the circuit are HIBID and LOBID to exclusive OR gate 3601, which indicate the presence of valid command for output transfer. The variable IRF32, as elsewhere, indicates the presence of a WRITE command. The output of AND gate 3602 is high in the presence of a WRITE command, switching the B inputs of multiplexer 3603 to the outputs of the multiplexer.

For simplicity of understanding, the operation of output control 36 will first be considered, excluding the existence of a WRITE command, so that the A inputs of the multiplexer 3603 are selected. In this situation, if FEF is high and FE is low, indicating that there is an address in the FIFO 38, then output 2Y of multiplexer 3603 becomes high, making OUTC1F high and OUTC1 low. This causes output select circuit 35a to select the address from the FIFO. If instead, FE is high and FEF is low, indicating the FIFO is empty, then OUTC1 becomes high.

Incorporated in the determination of the output OUTC0 is the false output OUTC1STF of flip-flop 3604. Flip-flop 3604 simply stores the previous values of OUTC1 and OUTC1F. The gates such as gates 3605-3604 with inputs from BWONF and SZF are the same as gates 3503-3505 of FIG. 8, and for the same purpose. If the OUTC1STF input to gate 3608 is high, indicating that the last output address was selected from the FIFO, and if the FE input to gate 3608 indicates that the FIFO is empty, then a high input is applied to input 3A of multiplexer 3603. This results in the 3Y output OUTCO becoming high. This in turn commands the output select circuit 35a to look at the relocate register circuit 39 for the next register address to be used. If OUTC1STF is low, indicating that the last address used was not from the FIFO, then OUTC0 is output as low, causing the output select circuit 35a to choose its next address from the internal register file 30.

If bit IRF32 is high, this means that the register of input register file 30 just selected by output select circuit 35a contained the first word of a WRITE pair. Therefore, when AND gate 3602 gives a high output, causing multiplexer 3603 to look at the B inputs thereof, one word of the WRITE pair has already been selected for output. Therefore the requirement is that the address of the next register selected for output come from the same source as that just preceding. Accordingly, it will be seen that the 1B input to multiplexer 3603 is the stored value of OUTC1ST, and the 2B input to the multiplexer is OUTC1STF. The 3B input to the multiplexer is a constant logic low level. This is because there is only one register address stored in the relocate register circuit 39, and the output select circuit 35a is not to look there a second time, but to look at the register in file 30 to which the relocate register points. Accordingly, OUTC0 under these conditions needs to be low, which is the correct state for looking either at the FIFO or the register file 30.

In the condition wherein output select circuit 35a has been looking at IRF (A-D), but the register selected for output is empty (HIBIDF and LOBIDF are high), then if FEF becomes high in circuit 36 of FIG. 12, necessitating a retry, then gate 3609 provides the required enabling signal CNTLF to store the changed value of OUTC1 in flip-flop 3604. The signal CNTLF performs the same function in circuit 35a of FIG. 8.

I claim:

1. A system for the high speed transfer of words from an input source to an output circuit such as a bus, each of said words comprising a preselected plurality of bits and each said word being transferred by reading said bits in parallel from a register, said output circuit being able to accept an individual word by issuing an acknowledge signal for the accepted word and to refuse an individual word by issuing a negative acknowledge signal for the refused word, rendering it necessary in the case of a refusal to retry transferring the word to the output circuit, said system comprising:
   a plurality of input registers each for receiving a word from the input source, said bits to be read from said input registers as said transfer of said word to the output circuit;
   busy bit means for each one of said input registers, for giving a busy indication as to whether said one of said input registers is unavailable to receive a new word from the input source;
   means responsive to said busy indications for selecting one of said input registers, which is available, if any, to receive a word from said input source;
   address bit means for each one of said input registers, for storing the address of the input register which is next to receive a word from the input source;
   a first-in, first-out memory;
   output select means for selecting one of the input registers for output to the output circuit, including selecting an input register address from among said address bits means and said first-in, first-out memory;
   means responsive to an acknowledged transfer of a word for resetting the busy indications to indicate that the input register containing said acknowledged word is available to receive a new word from the input source, and responsive to a negative acknowledged output of a word for entering the address of the input register containing the negative acknowledged word into said first-in, first-out memory; and
   means for directing the output select means to select an address from said first-in, first-out memory, if the memory contains at least one address, and when said memory does not contain any addresses, to select an address from said address bit means.

2. A system for the high speed transfer of words from an input source to an output circuit such as a bus, each of said words comprising a preselected plurality of bits and each said word being transferred by reading said bits in parallel from a register, said output circuit being able to accept an individual word by issuing an acknowledge signal for the accepted word and to refuse an individual word by issuing a negative acknowledge signal for the refused word, rendering it necessary in the case of a refusal to retry transferring the word to the output circuit, said system comprising:
   an input register file having plural input registers, with each input register having a section for busy bits, a section for the word which is to be transferred to the output circuit from the input source and a section for an address of the input register which is next to receive a word from the input source;
   means responsive to the busy bits of all said input registers for selecting one of said input registers, which is not busy, if any, to receive a word from said input source;
   a relocate register;
   a first-in, first-out memory;
   means for initiating the transfer of a word to the output circuit, including output select means for selecting one of the input registers for output to the output circuit, including selecting an input register address from among the register address sections of the input registers, the first-in, first-out memory, and the relocate register, and
   means responsive to the busy bits of an input register selected for output, for generating a bid to control said output device as soon as said register is selected for output, and the busy bits are entered therein;
   a shift register for receiving an input the address selected by said output select means;
   means for storing in the relocate register, the address of the input register to be selected for output after the last address in said memory has been selected;
   means responsive to said acknowledge signal for resetting one of the input registers ready to receive a new word from the input source and responsive to a negative acknowledge signal for entering the output of the shift register into the first-in, first-out memory; and
   control means for directing the output select means to select an address from said memory, if the memory contains at least one address, and next after selecting the last address in said memory, selecting an address from said relocate register, and in other cases, selecting an address from the register address section of one of said input registers.

3. The system of claim 3, wherein said register means includes a plurality of addressable storage locations for holding said words and means associated with each of said locations for pointing to the next of said locations receiving a word from said input source, so that as words in said register means are accepted by said output circuit in a substantially unpredictable sequence, storage locations holding the accepted words are reusable, while said means for pointing permits said initiating of said word transfers to be based on the order in which said words are received by the system from the input source.

4. The system of claim 3, further including means for sequentially storing addresses of locations in said register means corresponding to negatively acknowledged transfers.

5. The system of claim 4, further including means for selecting for an output transfer one of the addresses sequentially stored, and means for thereafter identifying the location in said register means of the first received word for which no output transfer has been attempted.

6. The system of claim 4, further including means responsive to the appearance at said input source of the first word of a sequence of related words, which sequence includes at least a second word, for delaying the complete loading of one of said input registers selected to receive said first word, until the appearance of said second word at said input source.

7. The system of claim 3, further including means responsive to the busy indications of an input register selected for output, for generating a bit to control said output circuit as soon as said register is selected for output, and the busy indications are entered therein.

* * * * *